April 5, 1949.   C. D. BYRD   2,466,372
CLUTCH CHUCK
Filed Nov. 25, 1944
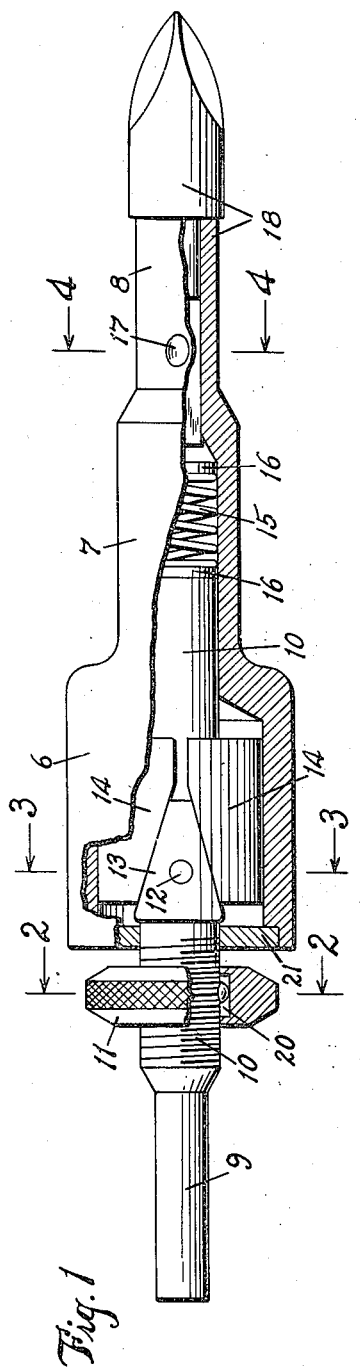
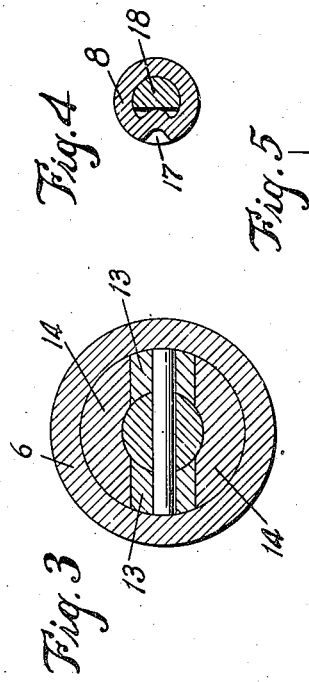
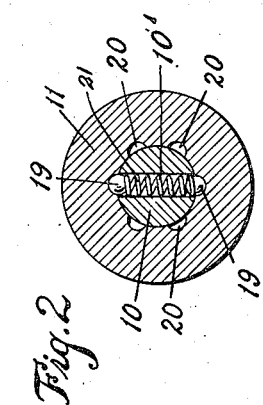
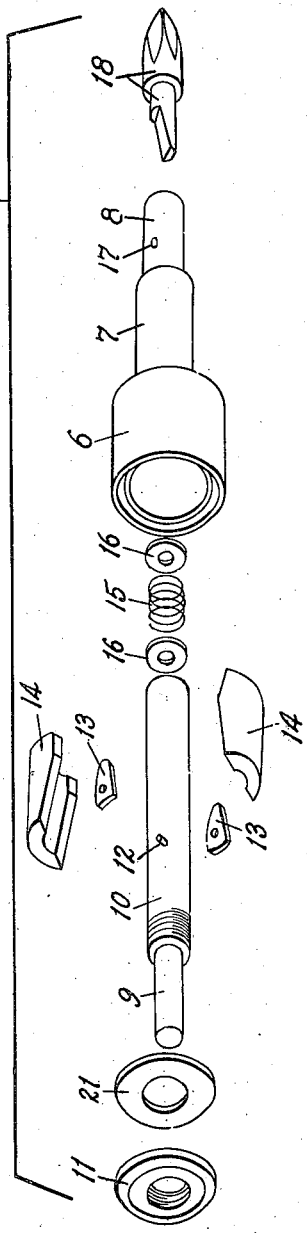
INVENTOR.
Conrad D. Byrd
BY Patented Apr. 5, 1949

2,466,372

UNITED STATES PATENT OFFICE 2,466,372

CLUTCH CHUCK

Conrad D. Byrd, Santa Monica, Calif.

Application November 25, 1944, Serial No. 565,112

2 Claims. (Cl. 279—1)

This invention relates to clutch chucks of the type designed to yield under excessive strain in order to prevent damage or injury to the parts to which the force is being applied, such as screw heads, nuts or other parts being turned by force.

Among the salient objects of my invention are: to provide a clutch chuck which is simple, practical and efficient, and which is economical to manufacture, and which can be made in sizes for hand operated tools, or for machine operated chucks; to provide a clutch chuck of the character referred to in which the parts thereof can be replaced or repaired, and which can be embodied in a form small enough to constitute a part of the tool equipment of a mechanic and carried in his tool box.

In order to further explain my invention, I have illustrated one practical embodiment thereof on the accompanying sheet of drawings which I will now describe. On the drawings—

Figure 1 is a side elevation of a clutch chuck embodying my invention, with parts in section to show the interior construction and arrangement;

Figures 2, 3 and 4, are cross sections taken, respectively, on the lines 2—2, 3—3 and 4—4, of Fig. 1; and Figure 5 is an exploded or separated view of all the parts in positions to be brought together in assembling.

Referring in detail to the drawings, a body of integral form is provided having the large cylindrical portion 6, the reduced cylindrical portion 7, and the tubular end portion 8. An operating shaft therein has the shank portion 9, an enlarged threaded portion 10, on which is a knurled nut 11. There is also a through pin 12, on which is placed, at opposite sides of said shaft, two wedge elements, 13, 13.

Mounted on said shaft, to co-operate with said wedge elements, are two members 14, 14, when put together around said shaft, constitute a pair of clutch members having tapering adjacent surfaces between which the wedge elements function, as will be clear from said drawings. These two clutch members 14, 14, when placed together around the shaft, at opposite sides of the wedge elements 13, 13, as shown, fit within the cylindrical portion 8 of the body, as shown, and are capable of being forced outwardly into gripping engagement with the inner surface of said body portion 8, as will be understood from the showing in Fig. 1.

Within the tubular portion 7 of the body is a coiled spring 15, with suitable washers, as 16, 16, at either end thereof as a bearing therefor, whereby said spring normally operates to force said shaft 10 outwardly, but said spring is compressible as said shaft is pressed inwardly in operation.

The tubular portion 8 of said body, it will be noted, is provided with some indents, as 17, designed to engaged on the inside, with the flat side of a tool 18, shown in Figs. 1 and 5, which tool may be a screw driver of the ordinary type, or the kind used in turning screws having different kinds of head sockets or slots therein, as will be readily understood by those versed in the art.

The knurled nut 11, as shown in the cross sectional view in Fig. 2, is provided with spring pressed balls 19, adapted to fit in corresponding indents 20 on the inside of the nut, whereby to hold said nut against being loose and for locking it in adjusted position. This is done by providing a bore through the shaft, as 10' and putting the coiled spring 21 transversely in said bore with the balls in the outer, opposite ends thereof. The indents 20 are really grooves, as seen in Fig. 1, extending transversely of the nut body, whereby to permit the nut to be moved on the threads a limited distance for the purpose of determining the amount of movement of the operating shaft when the tool is in operation. The further inwardly the shaft is pushed in operation, the further the wedge elements 13, 13 are forced between the clutch members 14, 14, and the tighter said clutch members are locked to the body 6, and the more force required to cause slippage before the tool damages the part being turned, as will be understood by those versed in the art.

Thus I have provided a clutch chuck of the character referred to which can be set for certain pressure limits in operation and whereby the force applied thereto in turning a screw or other object, will yield at a predetermined limit and permit slippage of the clutch element of the tool, for the purpose indicated.

I do not limit the invention to the details of construction and arrangement shown and described, except as I may be limited by the hereto appended claims, realizing that changes can be made within the real scope of the invention as here shown.

I claim:

1. In a clutch chuck, the combination with a shaft and a cylindrical member of larger diameter thereon and having means in its end for holding a tool, of a clutch means for locking said cylindrical member to said shaft and including two semi-tubular wedge shaped elements fitted around said shaft within said cylindrical member and two wedge elements at opposite sides of said shaft and between the tapering edges of said two semi-tubular wedge shaped elements, said wedge elements being secured to the opposite sides of said shaft to move therewith to and from the converging sides of said semi-tubular wedge shaped elements, whereby to expand them into holding frictional engagement with the inner surface of said cylindrical member.

2. In a clutch chuck, the combination with an operating shaft and a cylindrical member of larger diameter thereon with a reduced portion having means for holding a tool, of improved clutch means for locking said shaft and cylindrical member together, said means including two semi-tubular wedge shaped elements fitted around said shaft within the larger portion of said cylindrical member and two wedge elements secured to the opposite sides of said shaft and between the edges of said semi-tubular wedge shaped elements, whereby to be forced by the movement of said shaft inwardly between said later elements for forcing them apart into holding frictional engagement with said cylindrical member, and an adjustment nut on said shaft adjacent said cylindrical member.

CONRAD D. BYRD.

REFERENCES CITED

The following references are of record in the file of this patent:

UNITED STATES PATENTS

| Number | Name | Date |
| --- | --- | --- |
| 1,002,310 | Procunier | Sept. 5, 1911 |
| 1,196,839 | Bodene | Sept. 5, 1916 |
| 2,263,709 | Van Sittert | Nov. 25, 1941 |
| 2,287,457 | Stowell et al. | June 23, 1942 |